Sept. 8, 1942.   J. NORTON   2,295,182
PIPE CUTTING MACHINE
Filed Sept. 11, 1940   5 Sheets-Sheet 1

Inventor
James Norton
By Bryant & Lowry
Attorneys

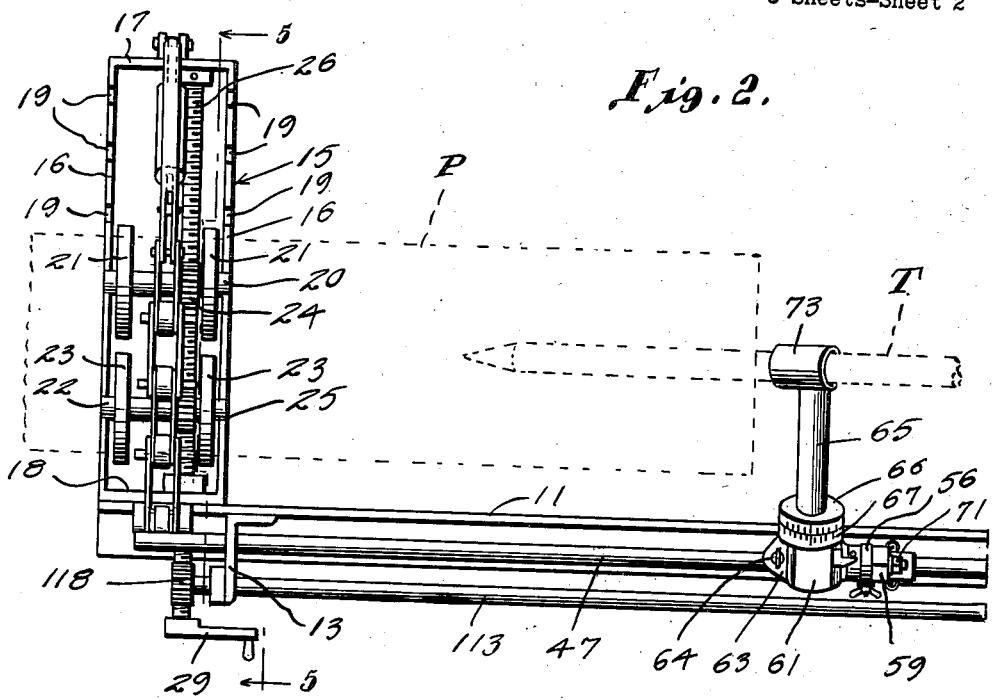
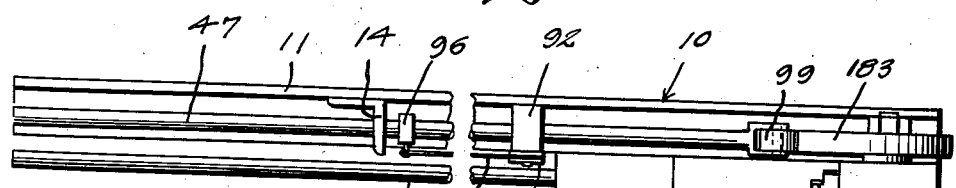
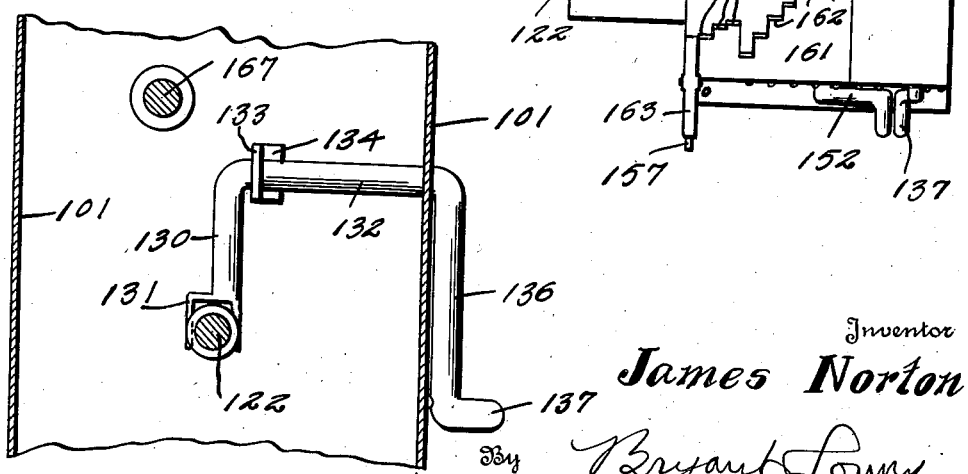

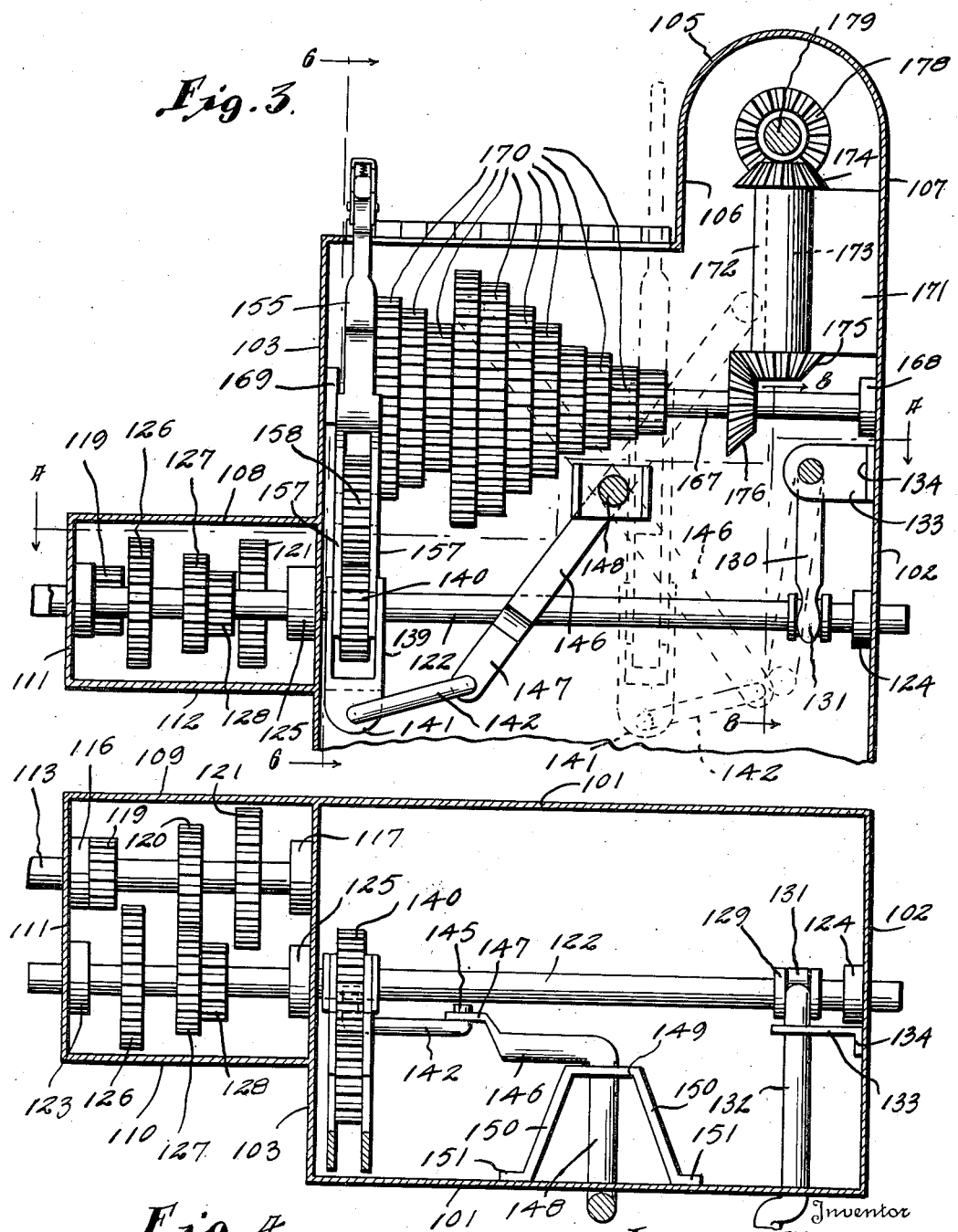

Sept. 8, 1942.  J. NORTON  2,295,182
PIPE CUTTING MACHINE
Filed Sept. 11, 1940    5 Sheets-Sheet 4
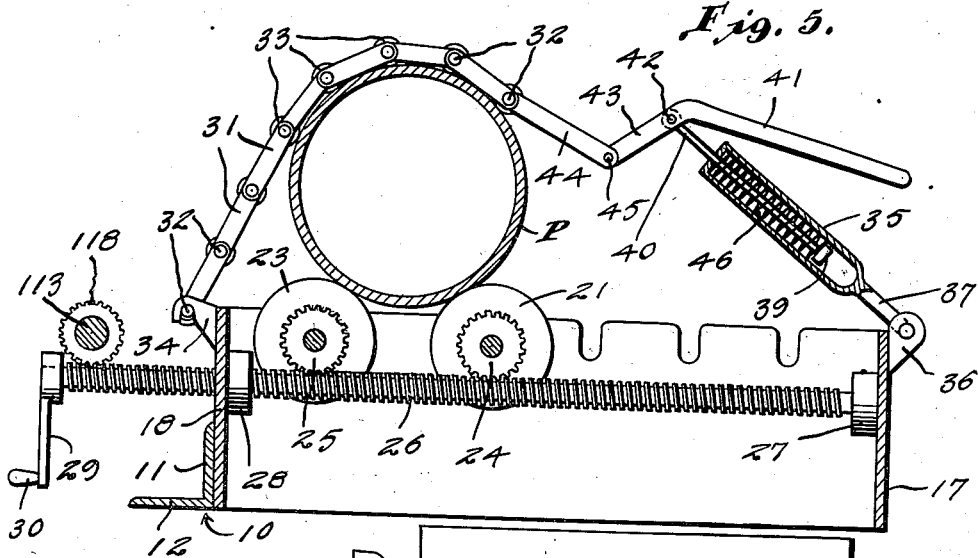
Fig. 5.
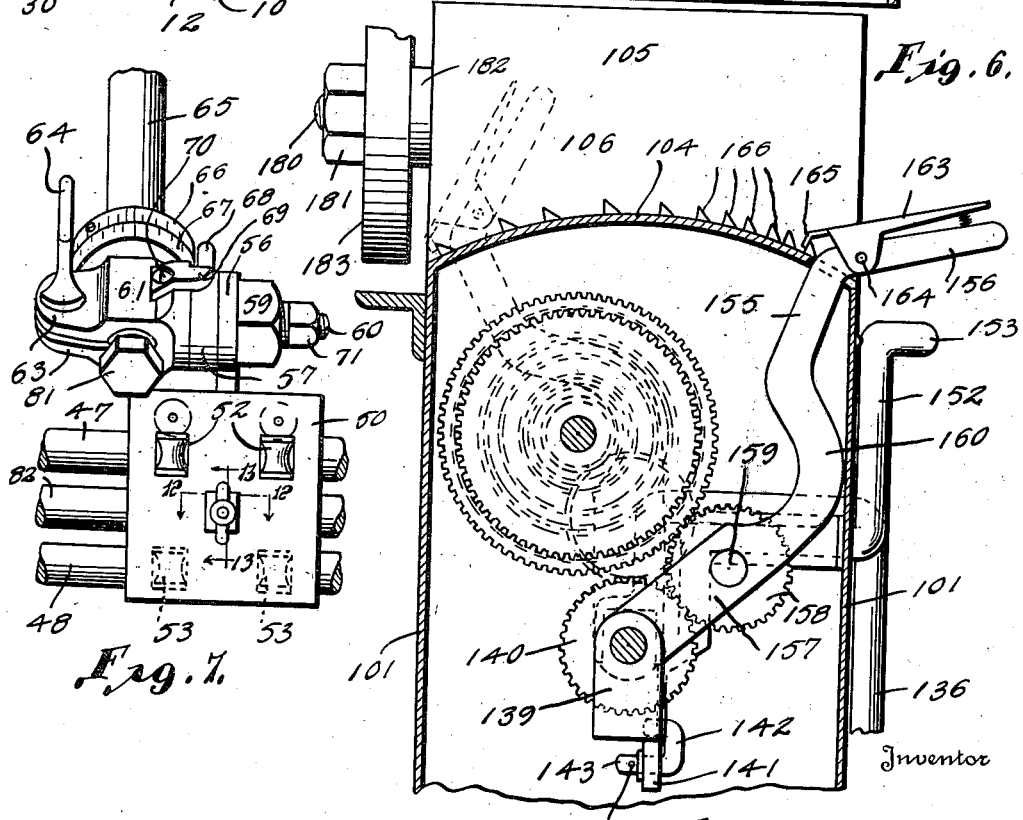
Fig. 6.
Fig. 7.
Inventor
James Norton
By Bryant & Lowry
Attorneys Sept. 8, 1942.   J. NORTON   2,295,182
PIPE CUTTING MACHINE
Filed Sept. 11, 1940   5 Sheets-Sheet 5
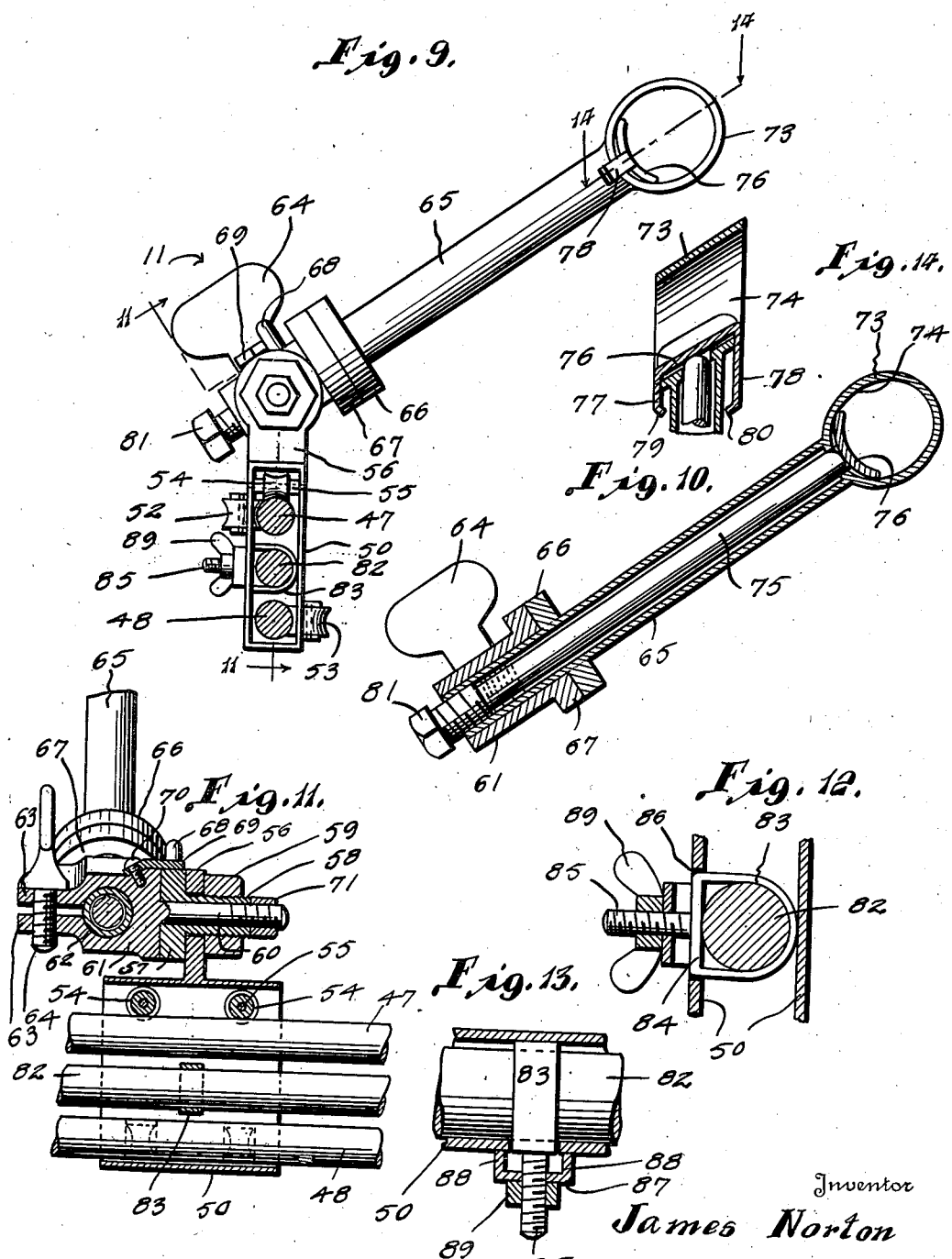

Patented Sept. 8, 1942

2,295,182

UNITED STATES PATENT OFFICE 2,295,182

PIPE CUTTING MACHINE

James Norton, Tulsa, Okla.

Application September 11, 1940, Serial No. 356,400

13 Claims. (Cl. 266—23)

The present invention relates to improvements in pipe cutting machines and particularly to machines for cutting pipes of large diameter.

The primary object of the invention is to provide a pipe cutting machine which may be adjusted to suit requirements so that the pipe will be cut at the required angular relationship to the axis thereof.

A further object of the invention is to provide a pipe cutting machine in which an acetylene torch is presented to the work so that the torch may be adjusted to produce a straight edge cut or a bevelled edge cut on the end of the pipe which is being operated on.

A still further object of the invention is to provide a pipe cutting machine in which the pipe may be cut on any desired transverse plane to the axis of the pipe by changing the relationship between the movement of the cutting torch longitudinally of the pipe's axis and the speed of rotation of the pipe during the cutting operation.

A still further object of the invention is to provide a pipe cutting machine including an acetylene torch capable of being moved longitudinally of the pipe axis under the guidance of a cam templet.

A still further object of the invention is to provide a pipe cutting machine having adjustable supporting rollers which may be readily spaced apart to adapt the machine to pipes of various diameters.

A still further object of the invention is to provide a pipe cutting machine in which the speed of rotation imparted to the pipe may be substantially constant and the movement of the cutting torch may be varied by interchangeable gears interposed between the constant speed pipe rotating means and the acetylene cutting torch.

Other objects and advantages of the invention will become apparent during the course of the following description of the accompanying drawings, wherein, Figure 1 is a detailed side elevational view illustrating one end of the machine embodying the invention for particularly illustrating the pipe supporting cradle;

Figure 2 is a top plan view of one end of the pipe cutting machine, further illustrating the adjustable pipe supporting cradle and the manner in which the acetylene torch is presented to the work;

Figure 2a is a top plan view illustrating the opposite end of the machine and specifically showing the templet and its arrangement which is adaptable to operate the acetylene torch slide bar;

Figure 3 is a longitudinal cross-sectional view illustrating in detail the arrangement of the interchangeable gears for imparting various driving speeds to the torch operating slide arm;

Figure 4 is a horizontal cross-sectional view taken on line 4—4 of Figure 3, looking in the direction of the arrows, further illustrating a speed change gearing between the cylinder operating drive means and the torch operating slide rod;

Figure 5 is an enlarged transverse cross-sectional detail view of the pipe supporting cradle illustrating the adjustable drive rollers and their interchangeable relationship with the drive means;

Figure 6 is a vertical cross-sectional view taken on line 6—6 of Figure 3, looking in the direction of the arrows, further illustrating the change speed gearing interposed between the cylindrical pipe and torch operating slide bar;

Figure 7 is an enlarged top elevational view of the acetylene torch supporting bracket and slide guide;

Figure 8 is a vertical cross-sectional view taken on line 8—8 of Figure 3, looking in the direction of the arrows, illustrating the interchangeable gear shifting lever associated therewith;

Figure 9 is a transverse vertical cross-sectional view taken on line 9—9 of Figure 1, looking in the direction of the arrows, illustrating in detail the construction of the torch supporting bracket and slide guide;

Figure 10 is a transverse cross-sectional view taken on line 10—10 of Figure 1, looking in the direction of the arrows, illustrating in detail the construction of the torch supporting arm and clamping means;

Figure 11 is a staggered cross-sectional view taken on line 11—11 of Figure 9, looking in the direction of the arrows, further illustrating the torch supporting bracket and slide guide for supporting the same;

Figure 12 is a vertical enlarged fragmentary cross-sectional view of the slide guide illustrating a locking clamp carried thereby for connection with the torch operating slide bar;

Figure 1:
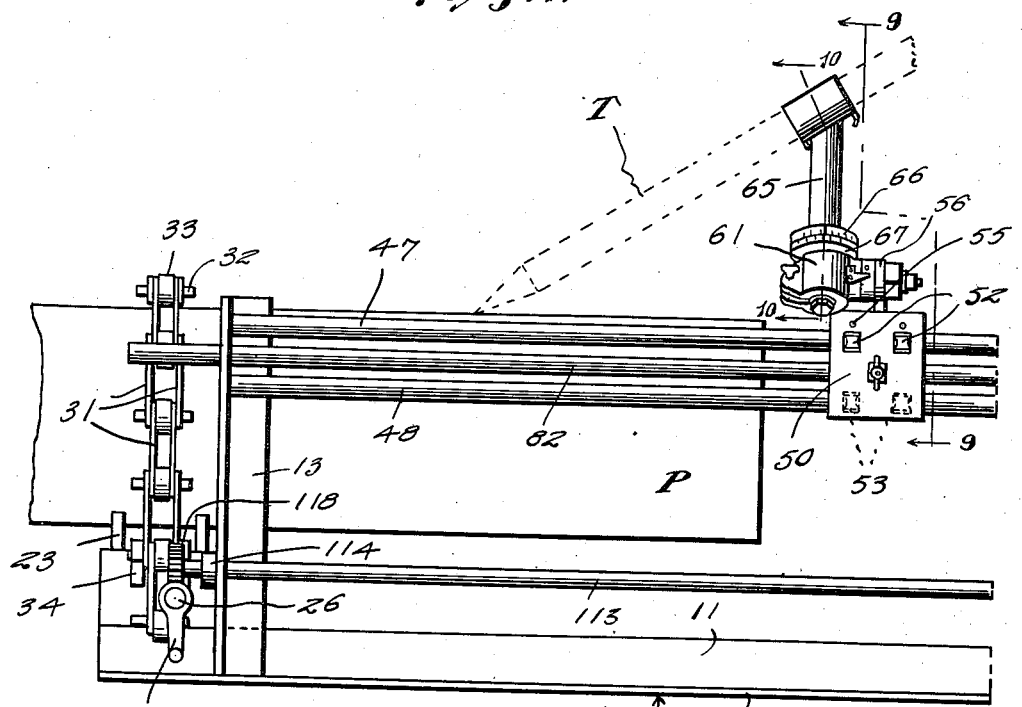
Figure 1a is a side elevational view and a continuation in part of Figure 1, showing the opposite end of the machine including the gear housing and templet cam.
Figure 1A:
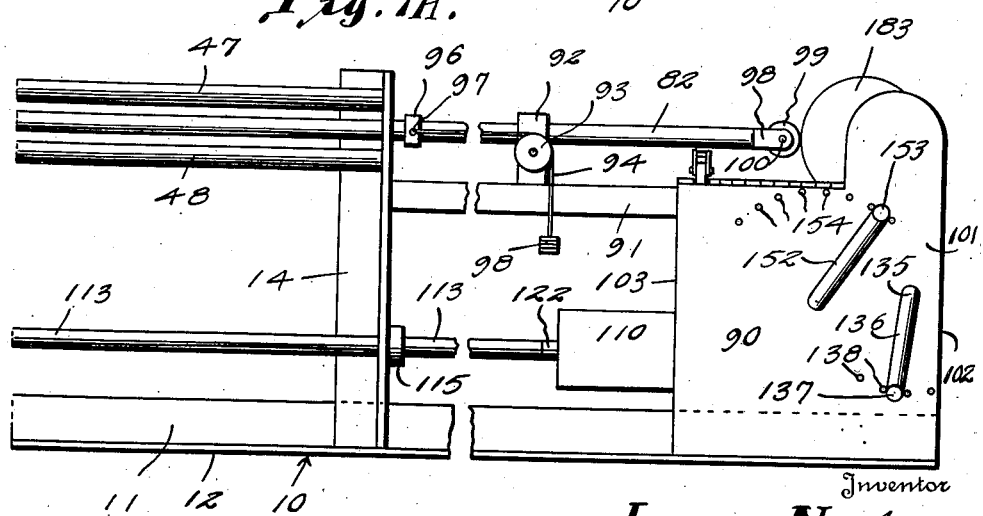

Figure 13 is a cross-sectional view greatly enlarged taken at right angles to Figure 12, further illustrating the locking connection between the slide guide and the acetylene torch operating slide bar; and Figure 14 is a longitudinal cross-sectional view taken on line 14—14 of Figure 9, looking in the direction of the arrows, illustrating in detail the construction of the acetylene torch clamping and holding means.

In the drawings, wherein for the purpose of illustrating the invention and wherein like reference characters will be employed to designate like parts throughout the same, the reference character 10 will generally be employed to designate a base member formed of an angle bar having vertical and horizontal flanges 11 and 12.

Adjacent the ends of the angle bar 10 and connected to the vertical flange 11 thereof are angle bar uprights 13 and 14. The angle bar uprights 13 and 14 may be welded in place or fastened by other suitable means.

Also secured to one end of the angle bar 10 is a cradle frame 15 including parallel side frame bars 16 connected at the ends by transverse cross bars 17 and 18. The cross bar 18 is welded to the vertical flange 11 of the angle bar base and the cradle supporting frame extends laterally therefrom.

A series of oppositely disposed notches 19 are formed in the parallel side frame members 16 and are adapted to receive a spindle 20 carrying adjacent its ends pipe supporting rollers 21. Similarly, an axle shaft 22 is supported in a pair of oppositely disposed notches formed in the parallel side frame members 16 and said axle shaft is provided with pipe supporting rollers 23 in radial alignment with the supporting rollers 21 whereby a piece of work such as a pipe P may be supported on the rollers so that the same may be rotated about its axis.

Rigidly secured to the axle shaft 20 is a gear wheel 24 and likewise, a gear wheel 25 is rigidly secured to the axle shaft 22. The gear wheels 24 and 25 are adapted to mesh with a rotating screw shaft 26 having one end rotatably journaled in a bearing 27 carried by the transverse frame member 17 while the opposite end is swiveled in a bearing 28 carried by the opposite transverse end wall 18. The screw threaded shaft 26 projects beyond the base member 10 and is provided with a crank arm 29 having a crank handle 30 whereby rotation of the screw threaded shaft 26 and the pipe supporting rollers 21 and 23 may be accomplished.

The work or pipe P is adapted to be held in place upon the supporting rollers 21 and 23 by means of a link chain including a series of link sections 31 joined and pivoted as at 32 by pivot pins. Mounted on the pivot pins and between the link sections 31 are a series of rollers 33 which engage the periphery of the work or pipe P as shown in Figure 5.

A hook 34 is formed on the transverse frame bar 18 and is adapted to receive one of the pivot pins 32 whereby said pipe engaging chain may swing transversely to the work about the axis of one of the pins 32 so that the free end may be resiliently anchored to the transverse cradle frame member 17. To accomplish such a resilient connection, a dash pot 35 is connected to a lug 36 on the transverse cradle frame member 17 by means of a loop 37 and said dash pot 35 is closed at one end as at 38 and is provided with a plunger 39 mounted on the extreme inner end of a plunger 40. The plunger 40 is provided with a pivoted lever 41 connected thereto as at 42 and said pivoted lever 41 is provided with an extension 43 for connection with the free swinging ends of the chain 31 by means of parallel links 44 connected to one of the pivot pins 32 and to the extension 43 by means of a pivot pin 45.

Swinging movement of the operating lever 41 will cause the compression of a coil spring 46 and the resultant locking of the hand lever 41 in an off-center position by reason of the extension 43.

Mounted in the upper ends of the angle bar uprights 13 and 14 is a pair of parallel spaced rods 47 and 48, the ends of which are welded or otherwise fastened in place adjacent the extreme ends of the vertical uprights 13 and 14.

Slidably mounted on the parallel rods 47 and 48 is a housing 50 having a pair of spaced rollers 52 mounted in one vertical wall thereof while on the opposite wall there is provided a pair of rollers 53 which engage the lower guide rod 48. Mounted in the upper portion of the slide guide 50 is a pair of grooved rollers 54 which straddle the upper guide rod 47 and are held in place by pins 55 extending through the vertical side walls of the slide guide.

Formed integral with the slide guide is a bracket arm 56 for receiving a tubular bolt 57 having a threaded portion 58 which extends through an aperture in the bracket arm 56 and is held in place by means of a nut 59 threaded on the screw threaded portion 58.

Extending through the tubular nut is a shaft 60 on one end of which is formed a clamping bracket 61 having a transverse bore 62 terminating in a bifurcated portion as at 63. A thumb bolt 64 extends through the bifurcations 63 so that the bore 62 may adjustably hold a tubular arm 65 having a flanged portion 66 which is adapted to engage a similarly shaped flange portion 67 on the bracket 61.

Formed on the tubular nut 57 is a projection 68 which is adapted to engage a latch plate 69 held in place by means of a screw 70, anchored in the bracket 61. It will thus be seen that the bracket 61 may be rotated on the spindle 60 to the desired position and then held in place by tightening the nut 71 on the threaded end of the spindle 60. The projection 68 may be moved to the desired position so that the arm 65 will be locked against downward movement.

The free end of the arm 65 is provided with an angular collar 73 having an angularly extending passageway 74 for receiving a blow torch of the acetylene type. Longitudinally extending through the tubular arm 65 is a rod 75 having one end projecting into the angular collar 74 so that a bearing plate 76 may engage the acetylene torch and hold it in position. The bearing plate 76 is angularly disposed on the end of the rod 75 and is provided at each end with downwardly extending aprons 77 and 78 which are provided with inwardly turned portions 79 and 80 to engage under the angularly shaped collar 73 and prevent displacement of the bearing plate 76.

Threaded in the opposite end of the tubular arm 65 is a bolt 81, the end of which is adapted to engage the lower end of the rod 75 for moving the same toward one end of the tubular arm 65 causing a clamping engagement between the clamping plate and the acetylene torch.

Slidably mounted in the vertical uprights 13 and 14 between the slide rods 47 and 48 is a bar 82 which extends through the slide guide 50 and is adapted to be anchored thereto by means of a yoke 83 extending therearound and said yoke is provided with a relatively flattened portion 84 to which is rigidly secured a screw threaded bolt 85. The flattened portion 84 of the yoke extends through a slot 86 formed in one side wall of the slide guide 50 so that a clamping plate 87 may be positioned on the bolt 85 so that the legs 88 at each end thereof may engage the side wall of the slide guide 50. A nut 89 is threaded on the bolt 85 to cause the legs 88 to exert a pressure on the side wall of the slide guide and at the same time exert a pull on the yoke 83 so that the rod 82 will be locked in position on the slide rod 82.

Formed at one end of the machine is a gear housing 90 braced from the vertical angle bar standard 14 by means of a horizontal bar 91. The slide rod 82 extends through a bearing 92 secured to the horizontal brace bar 91 and is adapted to carry a pulley 93 over which is trained a cable 94 having attached to one end thereof a weight 95. The opposite end of the cable is secured to a collar 96 attached to the slide rod 82 and said cable is anchored in place as at 97. The extreme free end of the slide rod 82 is bifurcated as at 98 for receiving a roller 99 pivotally mounted between the furcations by means of a pin 100.

The gear casing 90 is secured to one end of the angle base member 10 and extends laterally therefrom. The gear casing comprises side walls 101 connected by a rear wall 102 and a front wall 103. The top wall is slightly curved as at 104 and extending upwardly therefrom is a curved housing 105 connected thereto by a relatively straight portion 106 and having the opposite end connected to the rear wall 102 by means of a relatively straight portion 107.

A housing 108 is formed in the front wall 103 and includes a side wall 109 extending forwardly from the gear casing wall 101 and in opposition to the side wall 109 there is provided a side wall 110 extending forwardly from the end wall of the gear casing 103. The casing 108 is closed at one end by a wall 111 and is provided with a bottom wall 112.

Extending into the casing 108 is a shaft 113 rotatably mounted in the vertical standards 13 and 14 by suitable bearing collars 114 and 115. The shaft 113 extends into the casing 108 and is provided therein with bearings 116 and 117, on the walls of the casing 111 and 103.

The opposite end of the shaft 113 is provided with a worm gear 118 adapted to mesh with the screw threaded rod 26 so that when rotation is imparted to the screw threaded rod 26, the shaft 113 will be likewise rotated. The opposite end of the shaft 113 is provided with change speed gears 119, 120 and 121 which are rigidly secured to the shaft 113 to turn therewith.

Slidably mounted in the casing 90 longitudinally thereof is a shaft 122 having the ends slidably mounted in bearings 123 and 124 and it will be noted that the bearing 124 is carried by the end wall 102 while the slide bearing 123 is carried by the front wall of the casing 111. A slide bearing 125 further supports the slide rod 122 and is carried by the end wall of the casing 103. The ends of the shaft 122 project through the walls 102 and 111 a considerable distance to allow longitudinal sliding movements of said shaft 122 for the purpose of causing gear wheels 126, 127 and 128 to be brought into mesh selectively with the gear wheels 119, 120 and 121. It will be noted that when the slide shaft 122 is moved to its extreme left position, the gear wheel 119 will mesh with the gear wheel 126 thereby causing the slide shaft 122 to be rotated slower than the shaft 113.

When the gear wheel 121 is in mesh with the gear wheel 128 when the slide rod 122 is shifted to its extreme right hand position, the rotation of the shaft 122 will be much faster than when in mesh with the gear 119. When the gear wheels 120 and 127 are in mesh, there is a direct drive between the shafts 113 and 122.

Mounted on one end of the shaft 122 is a collar 129 which is adapted to be engaged by a forked arm 130 at the lower end as at 131. The forked arm 130 is provided with a shaft 132 supported by a bracket 133 having an angle portion 134 welded or otherwise secured to the rear wall 102 of the casing. The opposite end of the shaft 132 projects through an opening 135 formed in the side wall 101 and is provided with a crank arm 136 on the free end of which is provided an operating handle 137. The crank arm 136 is provided with a projection for being received in apertures 138 formed in the path of the arc inscribed by the crank arm 136 so that the sliding shaft 122 may be held in one of three positions corresponding to the desired drive effected by the gear wheels 119, 120 and 121 meshing with the gear wheels 126, 127, and 128.

Slidably mounted on the shaft 122 is a yoke 139 between the arms of which is located a gear wheel 140 slidably keyed to the shaft 122. The yoke 139 is provided with an extension lug 141 having an aperture for receiving a link 142, one end of which is bent as at 143 so that it may extend through the aperture in the lug 141 and be held in place by a cotter key 144. The opposite end of the link 142 is provided with an offset portion 145 adapted to be received in a crank arm 146 in the offset portion thereof as at 147. The crank arm 146 is formed on the end of a rotary shaft 148 which is journalled in the side wall 101 of the casing and is further supported by a bracket 149, the legs of which as at 150 are anchored to the side wall of the casing 101 by angular feet 151.

The free end of the shaft 148 is provided with a crank arm 152 on the end of which is formed a handle 153 so that the crank arm 152 may be brought into registry between projections 154 formed on the side wall of the casing 101 thereby sliding the gear 140 along the shaft 122.

Pivotally mounted on the shaft 122 for sliding movement relative thereto is an operating lever 155 having a handle 156 which is adapted to project through a series of openings in the top curved wall 104 of the casing 90. The lower end of the operating lever 155 is provided with spaced arms 157 which straddle the gear 140 and are mounted between the arms of the yoke 139 whereby sliding movement of the yoke 139 will likewise cause longitudinal sliding movement of the operating lever 155.

Pivotally mounted between the arms 157 is a gear wheel 158 suitably mounted on a stud 159 so that said gear wheel will constantly be in mesh with the gear wheel 140. The intermediate portion of the operating lever 155 is slightly curved as at 160 so that the operating lever handle will extend angularly and upwardly away from the casing 90. The top wall of the casing 104 is provided with an opening 161 and the edge of the top wall 104 is stepped as at 162 so that the operating handle may move longitudinally in the slot 161 and then may be moved toward one of the stepped portions 162 so that a latch 163 carried by the handle 156 and pivoted thereto as at 164 may have its end 165 engage any one of a series of projecting teeth 166 formed adjacent the stepped portion 162.

Rotatably mounted in the casing 90 between the end walls 102 and 103 is a shaft 167, the ends of which are mounted in journal bearings 168 and 169 respectively carried by the end walls 102 and 103. A series of various sized gears 170 is rigidly secured to the rotary shaft 167 and is adapted to be engaged selectively by the gear wheel 158 carried between the spaced arms 157 of the operating handle 155. As the gear 158 is slid longitudinally with respect to the gear wheels 170 until the desired position opposite one of the gear wheels 170 is located, the operating lever 155 is shifted forwardly in the opening 161 so that it will engage the corresponding step 162 and the latch lever dog 165 will engage the corresponding tooth 166. In this position, the selective rotative drive of the shaft 167 is acquired and the spaced arms 157 are moved along the shaft 122 by the crank arm 152.

Secured within the casing to the end wall 102 is a bracket 171 having a bearing 172 in which is rotatably mounted a shaft 173. On each end of the shaft 173 there is provided bevel gear wheels 174 and 175 and the gear wheel 175 is adapted to mesh with a correspondingly shaped bevel gear 176 rigidly attached to the rotary shaft 167.

The bevel gear 174 is adapted to mesh with a correspondingly shaped bevel gear 178 rigidly secured to a transverse shaft 179 journalled in the side walls of the housing 105. The shaft 179 projects through the housing 105 and the end thereof is threaded as at 180 for receiving a nut 181. A spacing collar 182 is located on the shaft 179 so that a cam templet 183 may be attached to the shaft 179 and held in place by the nut 181.

The cam templet 183 is adapted to engage the roller 99 carried by the end of the slide rod 82 whereby rotation of the cam templet 183 will cause a corresponding sliding movement to be imparted to the slide rod 82.

The templet 183 is interchangeable and may be removed so that a slightly different shaped templet may be positioned on the shaft 179 to cause various irregular movements to be imparted to the slide rod 82 and slide guide 50.

When an acetylene torch T is positioned on the end of the tubular arm 65 as shown in Figs. 1 and 2, the end of the torch T will be presented to the pipe P so that as the pipe is rotated by turning the hand crank 29, the torch T will be moved longitudinally in accordance with the shape of the templet 183 to produce a cut in the work P in accordance with the rotative speed of the work with relation to the sliding movement of the slide guide 50.

It will thus be seen that the operating handle 156 may be adjusted to bring the gear 140 into mesh with one of the gears 170 so that the relationship between the shafts 113 and 179 will be such as to produce the required speed of movement therebetween in order to produce transverse cuts on the pipe of a number of different degrees in angularity with respect to the axis of the pipe.

The gearing may be set so that the cam templet will make a complete revolution before a quarter of a revolution has been imparted to the pipe so that circular, oblong or other shaped openings may be formed in the pipe to produce joints in a much more easy manner than have heretofore been attained.

Likewise, the shaft 179 may be rotated so slow with respect to the rotation of the shaft 113 that the torch T will cut a scollop in the end of the pipe or may transversely cut the pipe angularly with respect to the axis thereof on a number of different degree angles.

It is to be understood that the form of the invention herewith shown and described is to be taken as the preferred embodiment of the same and that various changes in the shape, size and arrangement of parts may be resorted to without departing from the spirit of the invention or the scope of the sub-joined claims.

I claim:

1. A pipe cutting machine comprising a cradle for the pipe, means for rotating the pipe, a cutting torch slidably mounted longitudinally of the axis of the pipe means for reciprocating the torch and interchangeable gearing interposed between the pipe rotating means and torch reciprocating means for varying the speed of the torch, whereby said torch may be caused to move in reverse directions during a 90° rotation of the pipe.

2. A pipe cutting machine comprising a cradle for the pipe, means for rotating the pipe, a cutting torch slidable relative to the longitudinal axis of the pipe means for reciprocating the torch and interchangeable gearing for varying the speed between the pipe rotating means and reciprocatory speed of the cutting torch, whereby said torch may traverse the longitudinal axis of the pipe in more than two directions during a 180° rotation of the pipe.

3. A pipe cutting machine comprising a base frame, a pipe cradle carried at one end of the frame, means for rotating the pipe in the cradle, a cutting torch slidably carried by the base frame means for reciprocating the torch and interchangeable gearing means connecting the pipe rotating means and torch reciprocating means, whereby the cutting torch may move longitudinally of the axis of the pipe, in more than two directions during a 180° rotation of the pipe.

4. A pipe cutting machine comprising a base frame, a cradle mounted at one end of the frame for supporting a pipe, drive means associated with the cradle for rotating the pipe, a cutting torch slidably carried by the base frame and interchangeable drive means connecting the pipe rotating drive means with the torch operating means, whereby the relative speeds therebetween may cause the torch to traverse the longitudinal axis of the pipe in more than two directions during a 180° rotation thereof.

5. A pipe cutting machine comprising a base frame, a cradle mounted at one end of the frame for supporting a pipe, rollers carried by the cradle for rotating the pipe, a cutting torch slidably carried by the frame adapted to move longitudinally of the pipe and interchangeable gearing interposed between the rollers and the cutting torch, whereby the speed of the torch travel may be varied without altering the stroke thereof.

6. A pipe cutting machine comprising a base frame, a pipe supporting cradle at one end of the frame, rollers carried by the cradle for rotating the pipe, a drive shaft for the rollers, a cutting torch slidably carried by the base frame adapted to move longitudinally of the pipe axis, means for imparting sliding movement to the cutting torch and variable drive means interposed between the roller drive shaft and the torch operating means, whereby the speed of torch travel may be varied without effecting the longitudinal stroke of the torch.

7. A pipe cutting machine comprising a base frame, a cradle mounted at one end of the base frame, rollers for engaging and rotating the pipe, a drive shaft for said rollers, a gear housing located at the opposite end of the base frame, a guide-way supported by the base frame, a cutting torch slidably carried by the guide-way, means operable from the gear housing for reciprocating the cutting torch and interchangeable gearing interposed between the roller drive shaft and the torch reciprocating means.

8. A pipe cutting machine comprising a base frame, a cradle located at one end of the base frame, rollers carried by the base frame for engaging and rotating a pipe, a drive shaft for the rollers, a guide-way mounted on the base frame, a cutting torch slidably carried by the guide-way, a gear housing located on the opposite end of the base frame, gearing carried by the housing, means operable by the gearing for reciprocating the cutting torch longitudinally of the pipe axis and a shaft connecting the gearing with the roller drive shaft.

9. A pipe cutting machine comprising a base frame, a cradle mounted at one end of the frame, for rotatably supporting a pipe, a cable surrounding the pipe, rollers carried by the cable for engaging the periphery of the pipe, a pair of slide bars supported by the base frame, a slide guide mounted on the slide bars, a bracket secured to the slide guide, an adjustable torch support carried by the bracket, means for rotating the pipe and variable means for reciprocating the slide guide, whereby the cut generated may extend angularly in more than two directions during a 180° rotation of the pipe.

10. A pipe cutting machine comprising a base frame, a cradle mounted at one end of the base frame for rotatably supporting a pipe, a link chain surrounding the pipe and connected to the cradle for holding the pipe in place, rollers carried by the link chain for engaging the periphery of the pipe, a pair of slide bars supported by the base frame extending parallel with the pipe, a slide guide mounted on the slide bars, an adjustable bracket carried by the slide guide, a torch supported by the adjustable bracket, a reciprocating bar mounted between the slide bars connected to the slide guide, a roller on one end of the reciprocating bar, a cam templet adapted to reciprocate the reciprocating bar, means for rotating the pipe and means for rotating the templet at different speeds.

11. A pipe cutting machine comprising a base frame, a cradle mounted at one end of the base frame for rotatably supporting a pipe, adjustable rollers carried by the cradle, a screw threaded drive shaft for rotating the rollers, a pair of slide bars supported above the base frame, a slide guide carried by the slide bars, an adjustable bracket supported by the slide guide, a torch mounted on the free end of the adjustable bracket having its ends presented to the pipe, a reciprocating rod secured to the slide guide, a rotary templet cam for reciprocating the reciprocating bar, a drive shaft connected with the screw threaded drive rod for rotating the templet cam and interchangeable gearing interposed between the drive shaft and the rotary templet cam.

12. A pipe cutting machine comprising an elongate base frame, a pipe cradle mounted at one end of the frame, rollers carried by the cradle for supporting a piece of pipe, a drive shaft having screw threads for rotating the rollers, a pair of vertical uprights secured to the base frame, a pair of guide bars supported adjacent the upper ends of the vertical uprights, a bracket slidably mounted on the guide rods, an acetylene torch adjustably carried by the bracket, a reciprocating rod connecting the bracket, a cam templet engaging one end of the rod for imparting reciprocating motion thereto, means for rotating the screw threaded rod to impart rotation to the pipe and an interchangeable gear set interposed between the screw threaded drive rod and the cam templet.

13. A pipe cutting machine comprising an elongated base frame, a pipe supporting cradle at one end of the base frame, adjustably mounted rollers carried by the cradle for rotatably supporting a pipe, a screw threaded shaft for rotating the rollers, a hand crank mounted on the screw threaded shaft for manually driving rollers, a pair of slide bars carried by the base frame, a slide mounted on the slide bars, an adjustable bracket attached to the slide, an acetylene torch carried by the adjustable bracket, a slide rod attached to the slide, a cam templet adapted to engage the end of the slide rod for imparting reciprocating movement thereto, a gear housing located at the opposite end of the base frame, interchangeable gearing located in said housing adapted to drive said templet, and a longitudinal shaft adapted to be rotated by the screw threaded shaft for driving the interchangeable gearing.

JAMES NORTON.